(No Model.) 2 Sheets—Sheet 1.

G. TILGNER & J. C. WILCKE.
MASH TUB.

No. 384,180. Patented June 5, 1888.

Witnesses.
Adolph Roomus.
John L. Pearson.

Inventors
Gustav Tilgner.
Julius C. Wilcke.
By their Attorney Heinrich F. Bruns (No Model.) 2 Sheets—Sheet 2.

G. TILGNER & J. C. WILCKE.
MASH TUB.

No. 384,180. Patented June 5, 1888.

Witnesses.
Adolph Loomis.
John L. Pearson.

Inventors:
Gustav Tilgner.
Julius C. Wilcke.
By their Attorney Henrich F. Bruns

UNITED STATES PATENT OFFICE.

GUSTAV TILGNER AND JULIUS C. WILCKE, OF CHICAGO, ILLINOIS; SAID WILCKE ASSIGNOR TO SAID TILGNER.

MASH-TUB.

SPECIFICATION forming part of Letters Patent No. 384,180, dated June 5, 1888.

Application filed October 29, 1887. Serial No. 253,789. (No model.)

*To all whom it may concern:*

Be it known that we, GUSTAV TILGNER and JULIUS C. WILCKE, citizens of the United States, residing at Chicago, in the county of Cook and State of Illinois, have invented a new and useful Improvement in Mash-Tubs; of which the following is a specification, reference being had to the accompanying drawings, and letters of reference marked thereon, forming a part of this specification.

Our invention relates to mashing-machines, in which, in addition to rotating and revolving stirrers, sweeping blades or scrapers are employed to effect an equal and uniform treatment of the contents in the mash-tub to be used in brewing malt liquors, and to remove the same, after having been sufficiently worked upon so as to be ready for further use, automatically into the discharge-opening in said mash-tub. Hitherto said sweeping blades or scrapers have been attached to a beam or arm radially secured to a vertical rotary shaft in the center of a mash-tub. We secure said beam eccentrically to said vertical shaft. Thus we are enabled to attach sweeping-blades to the same, being parallel to said beam. The advantage reached thereby is obvious, as the beam, eccentrically secured, will not be pressed or pushed, but will be drawn, cutting through the grain in the tub, thus harmoniously co-operating with the blades attached to it, thereby greatly facilitating the working of the machinery.

Our invention also consists in providing a mash-tub with a screw-propeller adapting itself to the central mechanisms of the mashing-tub for removing the grain therefrom toward the sweeping-blades or the discharge-opening in the bottom of the mash-tub when the same is to be emptied; and our invention also consists in the combinations of these novel devices with other devices, as will be hereinafter described.

Figure 1:
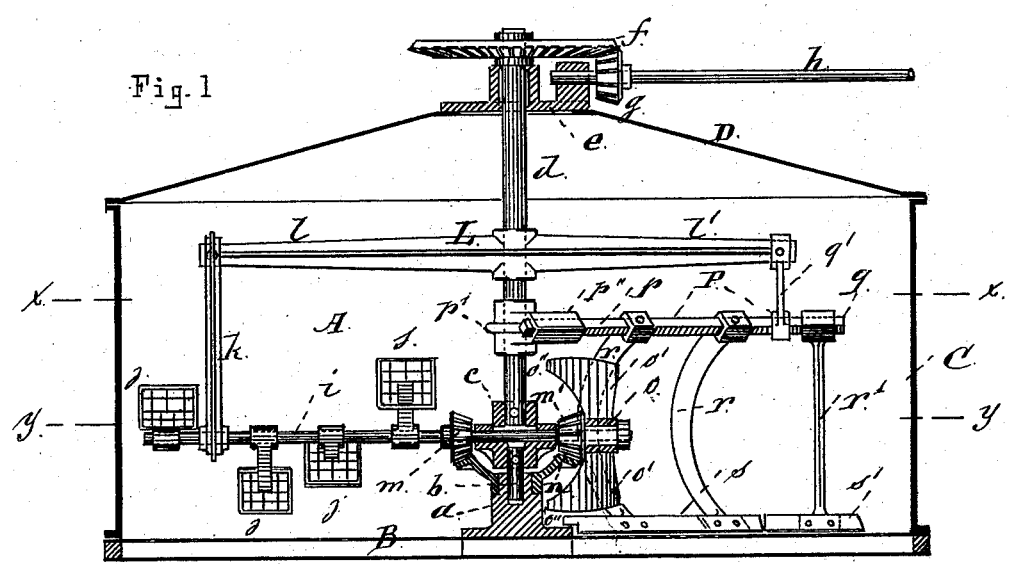
Figure 2:
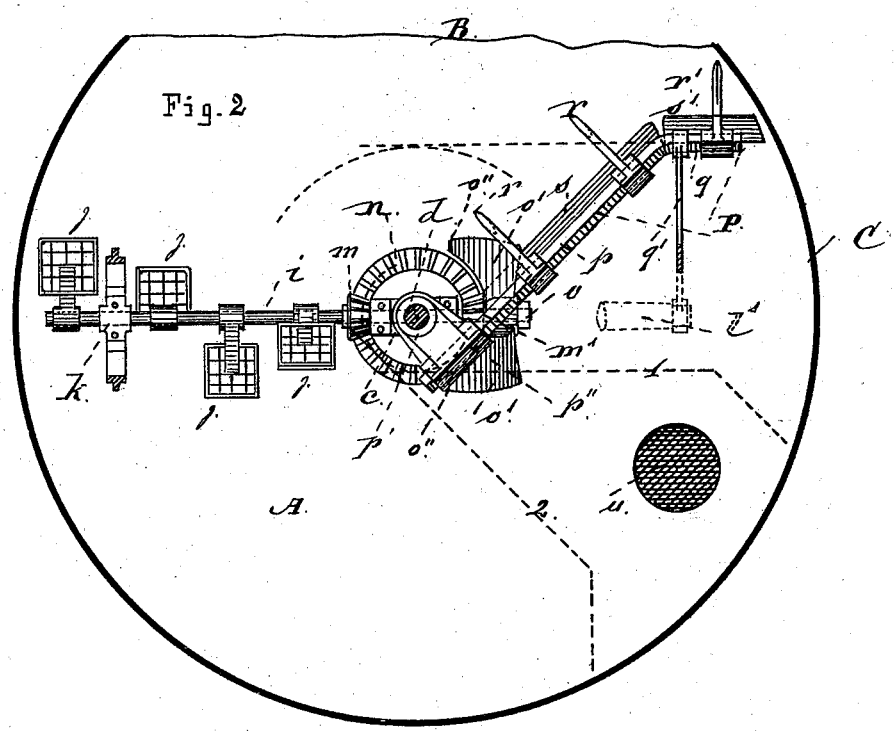
Figure 3:
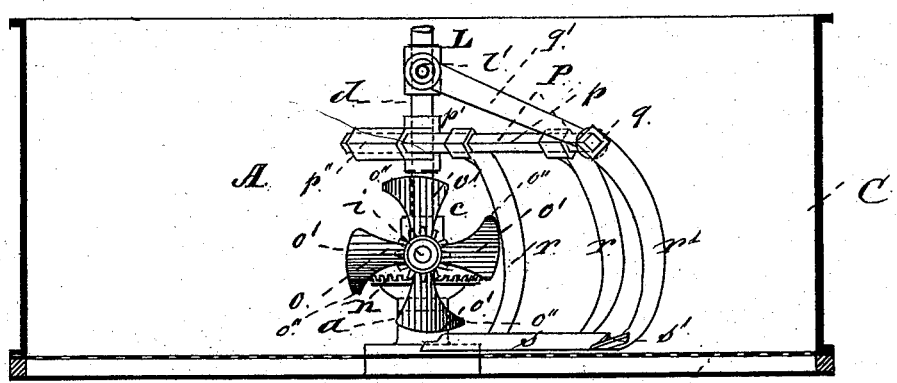
Figure 4:
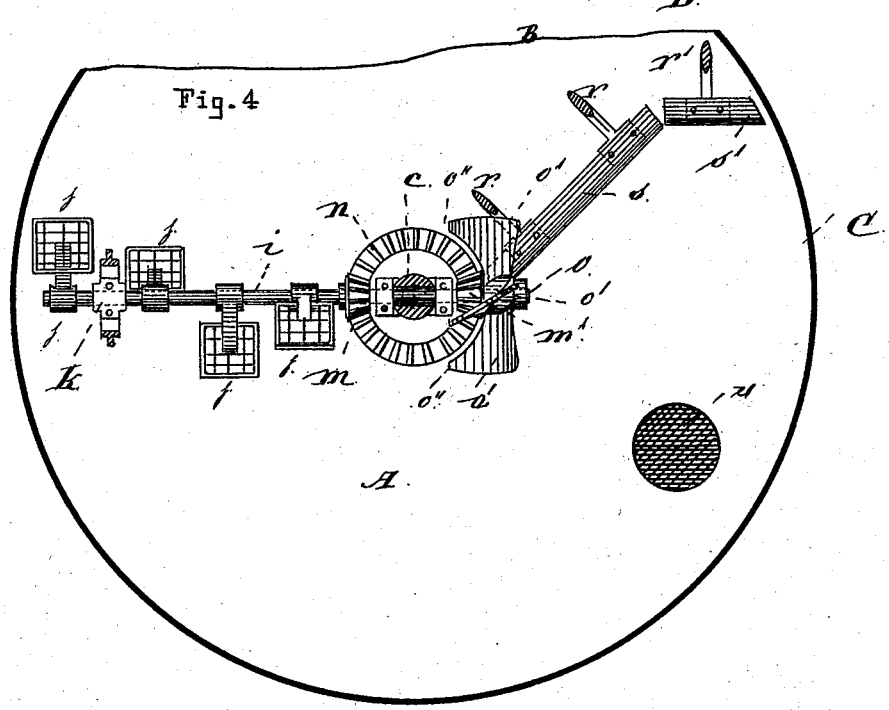

In the drawings, Figure 1 is a vertical central section of a mash-tub embodying our invention. Fig. 2 is a section at the line $x\ x$ of Fig. 1; Fig. 3, a vertical central section showing so much as represented with the shaft being turned at a right angle. Fig. 4 is a section at the line $y\ y$ in Fig. 2.

A represents an ordinary mash-tub, consisting of the bottom B and wall C, provided with a suitable covering, D. In the center, at the bottom of said tub, is firmly secured a step, $a$, to receive a pivot, $b$, rigidly fastened in a cross-shaped casting, $c$, which also holds firmly secured in its upper portion a shaft, $d$, the upper part of which is journaled in a suitable pillow-block, $e$, secured to the covering D of the mash-tub, and being in gear, by the bevel-wheels $f$ and $g$, with the driving-shaft $h$, to which the power is imparted.

The casting $c$ is in the shape of a cross, the vertical arms of which have rigidly attached to them the pivot $b$ and shaft $d$, while the horizontal arms of the same serve as bearings for one end of a horizontal shaft, $i$, said end extending through the whole casting $c$, which is open in the middle, and its arms forming bearings for the end of the shaft $i$ serve also as stops for two pinions, $m$ and $m'$, on the shaft $i$, one of which, $m$, is rigidly attached to the shaft $i$, while the other one, $m'$, is loose and put on the outer end of the shaft and fastened to or cast in one piece with a screw-propeller, $o$, consisting of a hub provided with wings $o'$, the same being sections of a screw-thread. The other end of the shaft $i$, provided with stirrers or agitators $j$, has its bearing in a hanger, $k$, extending down from the end $l$ of a beam, L, firmly and radially secured to the rotating shaft $d$.

It will be readily understood that the shaft $i$, with all its attachments, has two motions—a revolving and a rotating one—caused by the rotating shaft $d$, and the fixed pinion $m$ gearing with the bevel-wheel $n$, securely fastened around the step $a$. For this reason the screw-propeller is to be constructed so as to accurately adapt itself to the mechanism applied while revolving around the same without interfering in its rotating motion with any device which might be made use of in a mash-tub. Thus said screw-propeller $o$ has to perform two functions—it will serve as a stirrer or agitator and at the same time as a scraper in removing and clearing away the grain that might otherwise accumulate and adhere to the central mechanisms and become an obstacle and prevent the mash-tub from successfully being operated.

To attain this end, the wings, inverted to the center, overhang the hub and have their extremities come as nearly as possible to the central parts of the mechanisms. Their extreme corners, sweeping around the step $a$, therefore are cut straight, as will be seen at $o''$, in the drawings. Care also must be taken to have the wings of the screw-propeller set so around the hub as to render the maximum of work in removing the grain from the center toward the outlet $u$.

P is a beam, firmly secured to the rotating shaft $d$ by means of a casting, $p'$, encircling the shaft $d$, and provided with a socket, $p''$, to receive one end, $p$, of said beam P, while the other end, $q$, toward the periphery of the mash-tub, is connected with a rod, $q'$, extending down at an angle from the other end, $l'$, of the beam L. Thus the rod $q'$, being submitted to an absolute strain of tension, requires to be only of moderate strength; but still forms at the same time a solid frame-work by connecting the beams L and P. The beam P, toward the periphery of the mash-tub, is bent at an angle, according to the inclined positions the blades $s$ and $s'$ are to occupy to each other for removing the grain from the center of the tub and the periphery of its inclosure, respectively, toward the stirrers or the outlet in the tub. These blades $s$ and $s'$ are parallel with the respective parts $p$ and $q$ of the beam P, to which they are fastened by means of the arms $r\ r$ and $r'$. Different positions are shown in Fig. 2 of the drawings by dotted lines 1 and 2.

As will be readily understood by the drawings, the setting of the blades at an angle or inclined position, so as not to have them radially extending from the center of the shaft $d$, is the direct result of fastening the beam P eccentrically to the shaft $d$—that is to say, to fasten the beam P to the shaft $d$ in such a manner that the longitudinal central line of said beam will be the tangent of a circle described from the center of the vertical rotating shaft $d$, said circle to be in the same horizontal plane with the longitudinal central line of the beam P, as is indicated by dotted lines in Fig. 2 of the drawings. The extension of the part $q$ of the beam P also will be a tangent of a circle described from the center of the rotating shaft $d$, as is also indicated by dotted lines in Fig. 2.

The arms $r\ r$ and $r'$ are bent into the shape of a bow, and in cross-section sharp-edged, so as to allow of the same cutting through the contents in the mash-tub with the least possible resistance to be encountered.

The mash-tub is operated as follows: The contents of the mash-tub, consisting of grain prepared for the purpose and mixed up with water, are worked upon by the stirrers or agitators and sweepers, and the screw-propeller until the desired end is achieved and the grain ready to be discharged through the opening $u$. As will be readily understood by the drawings, motion is imparted by the shaft $h$, to which the driving-pulley is attached, and being in connection with the shaft $d$, by means of the bevel-wheels $f$ and $g$. Thus the vertical shaft $d$ is caused to rotate and the horizontal shaft $i$ to revolve around the shaft $d$, at the same time rotating around its own axis, thereby putting into operation its stirrers or agitators and the propeller-screw, while the sweeping-blades, almost touching the bottom of the tub, prevent the grain from becoming clogged or cohesive and adhering to the bottom or inclosure of the tub, and are the means by which the grain is swept toward the outlet when required.

We are aware that mashing-machines provided with rotating and revolving stirrers, in combination with revolving scrapers are not new; but we do not known that there are any mashing-machines made prior to our invention in which the sweeping-blades are attached to a beam running parallel with the same said beam eccentrically secured to a vertical rotary shaft.

Therefore, what we claim, and desire to secure by Letters Patent, is—

1. In a mash-tub, a beam, P, as described, eccentrically fastened to a vertical rotary shaft, a beam, L, radially fastened to the same shaft, $d$, and said beams L and P being connected by rod $q'$, and arms $r\ r$ and $r'$, having blades $s$ and $s'$ attached, running parallel to the respective parts $p$ and $q$ of the beam P, all combined substantially as and for the purpose specified and shown.

2. In a mash-tub, a beam, P, as described, eccentrically fastened to a vertical rotary shaft, $d$, arms $r\ r$ and $r'$, sweeping-blades $s$ and $s'$, being parallel to the respective parts $p$ and $q$ of beam P, and discharge-openings $u$, all combined substantially as and for the purpose specified and shown.

3. In a mash-tub, the combination of the shaft $i$, provided with stirrers, fixed pinion $m$, loose pinion $m'$, the same being rigidly attached to a screw-propeller, $o$, having wings $o'$, as described, and crown-wheel $n$, secured to a step, $a$, substantially as and for the purpose specified and shown.

4. In a mash-tub, the shafts $d$ and $h$, said shaft $d$ carrying sweeping-blades $s$ and $s'$, bevel-wheels $f$ and $g$, pillow-block $a$, casting $c$, having sockets into which are firmly secured the shaft $d$ and pivot $b$, the shaft $i$, provided with stirrers and extending through an opening in said casting $c$, so as to rest with one of its ends in bearings forming parts of said casting $c$, fixed and loose pinions $m$ and $m'$ upon the shaft $i$, the loose one being rigidly attached to a screw-propeller, $o$, and crown-wheel $n$ upon the step $a$, all combined substantially as and for the purpose specified and shown.

5. In a mash-tub, the combination of blades $s$ and $s'$, when attached by means of arms $r\ r$ and $r'$ to a beam, P, and being parallel with the same, said beam eccentrically secured to a vertical rotary shaft, $d$, and stirrers attached to a horizontal rotary shaft revolving around the shaft $d$ when said shaft $i$ extends with one of its ends through a casting, $c$, provided with bearings for said end of the shaft $i$, the same having a fixed and a loose pinion, $m$ and $m'$, and both engaging with a fixed crown-wheel, $n$, upon the shaft $a$, substantially as and for the purpose specified and shown.

GUSTAV TILGNER.
JULIUS C. WILCKE.

Witnesses:
ADOLPH ASSMUS,
HEINR. F. BRUNS.